United States Patent
Liu et al.

(10) Patent No.: US 11,863,803 B2
(45) Date of Patent: Jan. 2, 2024

(54) LIVE STREAMING INTERFACE INTERACTION METHOD AND APPARATUS, ELECTRONIC DEVICE, AND COMPUTER-READABLE MEDIUM

(71) Applicant: BEIJING BYTEDANCE NETWORK TECHNOLOGY CO., LTD., Beijing (CN)

(72) Inventors: Wenjing Liu, Beijing (CN); Cheng Chi, Beijing (CN); Kun Chang, Beijing (CN); Guizhang Chen, Beijing (CN); Yu Li, Beijing (CN); Chenkang Li, Beijing (CN); Meng Chen, Beijing (CN); Zhenwei Lai, Beijing (CN); Yingke Wang, Beijing (CN)

( * ) Notice: Subject to any disclaimer, the term of this patent is extended or adjusted under 35 U.S.C. 154(b) by 0 days.

(21) Appl. No.: 18/148,388

(22) Filed: Dec. 29, 2022

(65) Prior Publication Data
US 2023/0144560 A1    May 11, 2023

Related U.S. Application Data

(63) Continuation of application No. PCT/CN2021/119568, filed on Sep. 22, 2021.

(30) Foreign Application Priority Data

Oct. 12, 2020    (CN) .......................... 202011086781.2

(51) Int. Cl.
    *H04N 21/21*    (2011.01)
    *H04N 21/2187*    (2011.01)
    (Continued)

(52) U.S. Cl.
    CPC ..... *H04N 21/2187* (2013.01); *H04L 65/1093* (2013.01); *H04N 21/4312* (2013.01)

(58) Field of Classification Search
    None
    See application file for complete search history.

(56) References Cited

U.S. PATENT DOCUMENTS

| 7,111,320 B1 | 9/2006 | Novak |
| 2013/0205208 A1 | 8/2013 | Kim et al. |

FOREIGN PATENT DOCUMENTS

| CN | 103513907 A | * | 1/2014 |
| CN | 103513907 A | | 1/2014 |

(Continued)

OTHER PUBLICATIONS

China National Intellectual Property Administration, Office action issued in application No. 202011086781.2, dated Dec. 6, 2021, 8 pages.

(Continued)

*Primary Examiner* — Cai Y Chen
(74) *Attorney, Agent, or Firm* — Alleman Hall Creasman & Tuttle LLP

(57) ABSTRACT

The present disclosure relates to the field of network live streaming, and provides a live streaming interface interaction method and apparatus, an electronic device, and a computer-readable medium. The method comprises: displaying, on a live streaming interface, a first function control and a second function control used for indicating the same function state; receiving an interactive operation acting on the live streaming interface, and switching the function state of the first function control and the second function control when it is determined that the interactive operation meets a preset condition; and respectively displaying corresponding guide animations on display positions corresponding to the first function control and the second function control, so as to prompt a user to perform the next interactive operation.

19 Claims, 6 Drawing Sheets

(51) Int. Cl.
*H04L 65/1093* (2022.01)
*H04N 21/431* (2011.01)

(56) References Cited

FOREIGN PATENT DOCUMENTS

| | | | |
|---|---|---|---|
| CN | 304624850 S | 5/2018 | |
| CN | 305066219 S | 3/2019 | |
| CN | 109688418 A | 4/2019 | |
| CN | 110943912 A | 3/2020 | |
| CN | 111405302 A | 7/2020 | |
| CN | 111714874 A | 9/2020 | |
| CN | 112218170 A | 1/2021 | |
| EP | 4145841 A1 * | 3/2023 | ......... H04N 21/2187 |

OTHER PUBLICATIONS

ISA China National Intellectual Property Administration, International Search Report issued in application No. PCT/CN2021/119568, dated Dec. 27, 2021, 4 pages.
China National Intellectual Property Administration, Notice of Grant issued in application No. 202011086781.2, dated Aug. 5, 2022, 4 pages.

* cited by examiner

LIVE STREAMING INTERFACE INTERACTION METHOD AND APPARATUS, ELECTRONIC DEVICE, AND COMPUTER-READABLE MEDIUM

CROSS REFERENCE OF RELATED APPLICATION

This application is continuation application of PCT international patent application PCT/CN2021/119568, filed on Sep. 22, 2021 which claims priority to Chinese Patent Application No. 202011086781.2, titled "LIVE STREAMING INTERFACE INTERACTION METHOD AND APPARATUS, ELECTRONIC DEVICE, AND COMPUTER-READABLE MEDIUM", filed on Oct. 12, 2020 with the China National Intellectual Property Administration, both of which are incorporated herein by reference in their entireties.

FIELD

The present disclosure relates to the technical field of live streaming, and in particular to a method and a device for interaction on a live streaming interface, an electronic apparatus, and a computer-readable medium.

BACKGROUND

With an overall rise of live streaming industry, a broadcast mode of live streaming becomes more and more popular, and more and more live streaming content has joined the industry. As the live streaming industry develops, the quantity of anchors is increasing, and competition among anchors is growing. Most of the anchors maintain user retention in a live streaming room by guiding audience users to follow the anchors, join fan clubs of the anchors, and the like, in order to improve a competitiveness of the anchors.

Conventionally, a live streaming interface is provided with a "Follow" button. In response to an audience user entering a live streaming room of an anchor, the "Follow" button is displayed at a fixed position at an upper left corner of the live streaming interface of the anchor to prompt the audience user to follow the anchor, in a case that the audience user has not followed the anchor yet. After the audience user tap the "Follow" button and follows the anchor, a guiding animation for joining a fan club appears at the fixed position, and an entrance to the fan club is displayed. However, due to limitation of a location and dimension of a live streaming interface template, the effect of the animation for guiding the audience user to follow the anchor is limited, which reduces a performance effect of prompt information for guiding the user to follow the anchor.

SUMMARY

The summary is provided to introduce concepts in a simplified form, which are described in detail in the following detailed description. The summary is not intended to identify key features or essential features of the claimed technical solution, nor is it intended to limit the scope of the claimed technical solution.

In a first aspect, a method for interaction on a live streaming interface is provided in an embodiment of the present disclosure. The method includes: displaying a first function control and a second function control on a live streaming interface, wherein the first function control and the second function control indicate a same function state; receiving an interactive operation on the live streaming interface, and switching the function state of the first function control and the second function control on determining that the interactive operation meets a preset condition; and displaying, based on a function state after switching, guidance animations at display positions corresponding to the first function control and the second function control, respectively, to prompt a user to perform a next interactive operation.

In a second aspect, a device for interaction on a live streaming interface is provided in an embodiment of the present disclosure. The device includes: a control display module, configured to display a first function control and a second function control on a live streaming interface, wherein the first function control and the second function control indicate a same function state; a state switching module, configured to receive an interactive operation on the live streaming interface, and synchronously switch the function state of the first function control and the second function control, on determining that the interactive operation meets a preset condition; and an animation display module, configured to display, based on a function state after switching, guidance animations at display positions corresponding to the first function control and the second function control, respectively, to prompt a user to perform a next interactive operation.

In a third aspect, an electronic apparatus is provided in an embodiment of the present disclosure. The electronic apparatus includes: one or more processors; a memory; and one or more application programs. The one or more application programs are stored in the memory and configured to be executed by the one or more processors. The one or more programs are configured to perform the method for interaction on a live streaming interface.

In a fourth aspect, a computer-readable medium is provided in an embodiment of the present disclosure. The computer-readable medium stores a computer program. The computer program, when executed by a processor, implements the method for interaction on a live streaming interface described in the present disclosure.

Beneficial effects of the technical solutions provided in the present disclosure are described below.

With the method and device for interaction on a live streaming interface, the electronic apparatus, and the computer-readable medium, the first function control and the second function control indicating a same function state are displayed on the live streaming interface; the interactive operation on the live streaming interface is received, and the function state of the first function control and the second function control is switched synchronously on determining that the interactive operation meets the preset condition; and the guidance animations are displayed at the display positions corresponding to the first function control and the second function control, respectively, to prompt the user to perform the next interactive operation. In the solution of the present disclosure, in addition to the function control set at the fixed position on the template according to the related technology, another function control is added. By two function controls indicating a same function state, expressiveness of the function state is enhanced, which is more conducive to guiding the user to conduct an interactive operation based on the function state. In addition, the two function controls are linked with each other. In response to an interactive operation on one of the function controls, the other one of the function controls switches the function state synchronously even if not taped, so as to keep the consistency of the function state of the two function controls. Therefore, the expressiveness and attractiveness of the function state of the function controls are improved, which is more conducive to guiding the audience user.

Additional aspects and advantages of the present disclosure are given in the following description, which will become apparent from the following description or learned from practice of the present disclosure.

BRIEF DESCRIPTION OF THE DRAWINGS

The above and other features, advantages and aspects of various embodiments of the present disclosure will become clearer when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
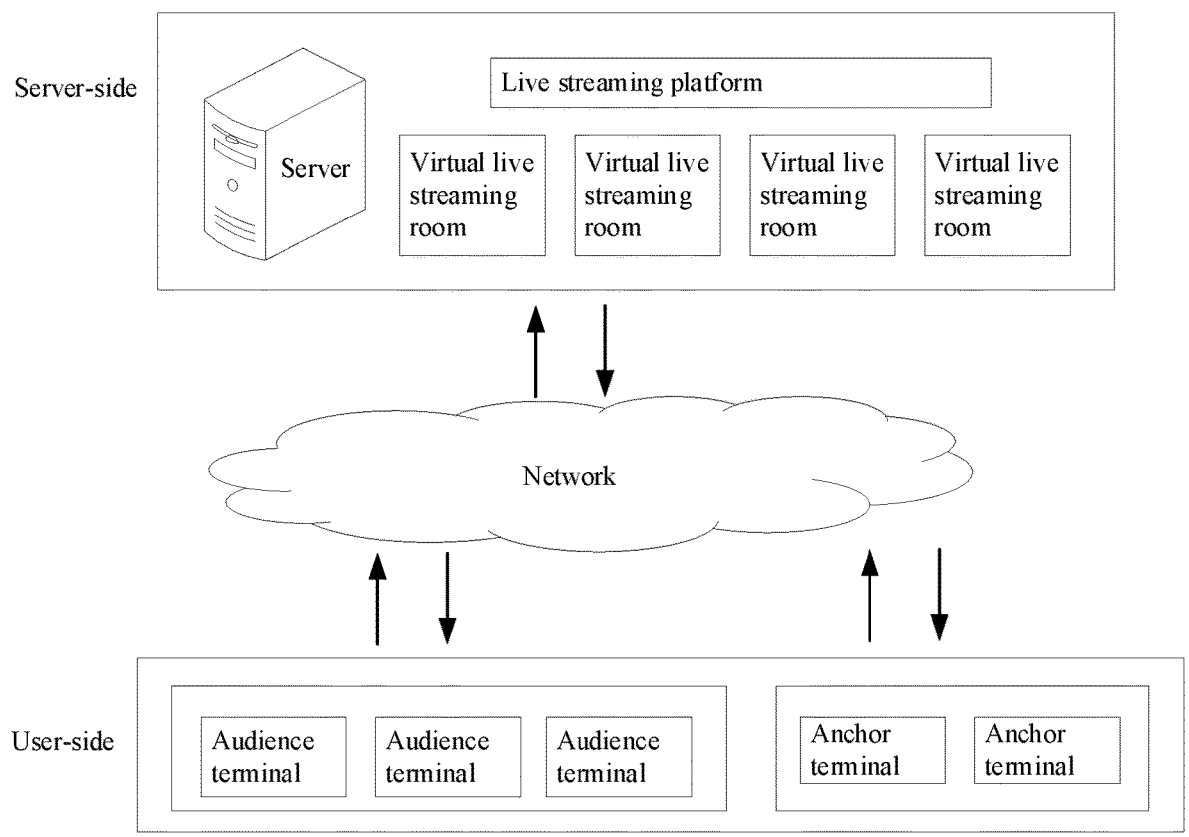
FIG. 1 is a schematic diagram of a framework of a live streaming system according to an embodiment of the present disclosure.

Embodiments of the present disclosure are described in more detail below with reference to the accompanying drawings. Although certain embodiments of the present disclosure are shown in the drawings, it should be understood that the present disclosure may be embodied in various forms and should not be construed as being limited to the embodiments set forth herein. The embodiments are provided for a more thorough and complete understanding of the present disclosure. It should be understood that the drawings and embodiments of the present disclosure are provided as examples only, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variants thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used for distinguishing different devices, modules or units, and are not intended to limit that these devices, modules or units are different, or limit an order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

Before introducing the method provided by the embodiments of the present disclosure, application scenarios of the embodiments of the present disclosure are introduced. The method provided in the embodiments of the present disclosure is applicable to a living streaming system. Reference is made to FIG. 1, which is a schematic diagram of a framework of a live streaming system according to an embodiment of the present disclosure. The system framework may include a server side and a user side. The user side includes one or more anchor end terminals and multiple audience terminals. A live streaming platform on the server side may include multiple virtual live streaming rooms, a server, and the like. Each of the anchor terminals and the audience terminal establishes communicative connection with the server through wired or wireless network.

Generally, the virtual live streaming rooms present different live streaming content. An anchor user provide a live streaming through an anchor terminal, and an audience user selects, through an audience terminal, to enter a virtual live streaming room to watch the live streaming provided by the anchor user. The audience terminal and the anchor terminal may access the live streaming platform through a live streaming application (APP) installed on an electronic apparatus.

Each of the anchor terminal and the audience terminal is an electronic apparatus, such as a smart phone, a tablet, a desktop, or a laptop, which is not limited here. The server is a background server configured to provide background services for the electronic apparatus. The server may be realized by a standalone server or a server cluster composed of multiple servers. In an embodiment, the server may be a live streaming platform. The anchor terminal may record a video for the anchor user, and synchronously upload the video to the live streaming platform. Then the live streaming platform pushes the video to the audience, so that audience users can view the live steaming video of the anchor user.

Figure 2:
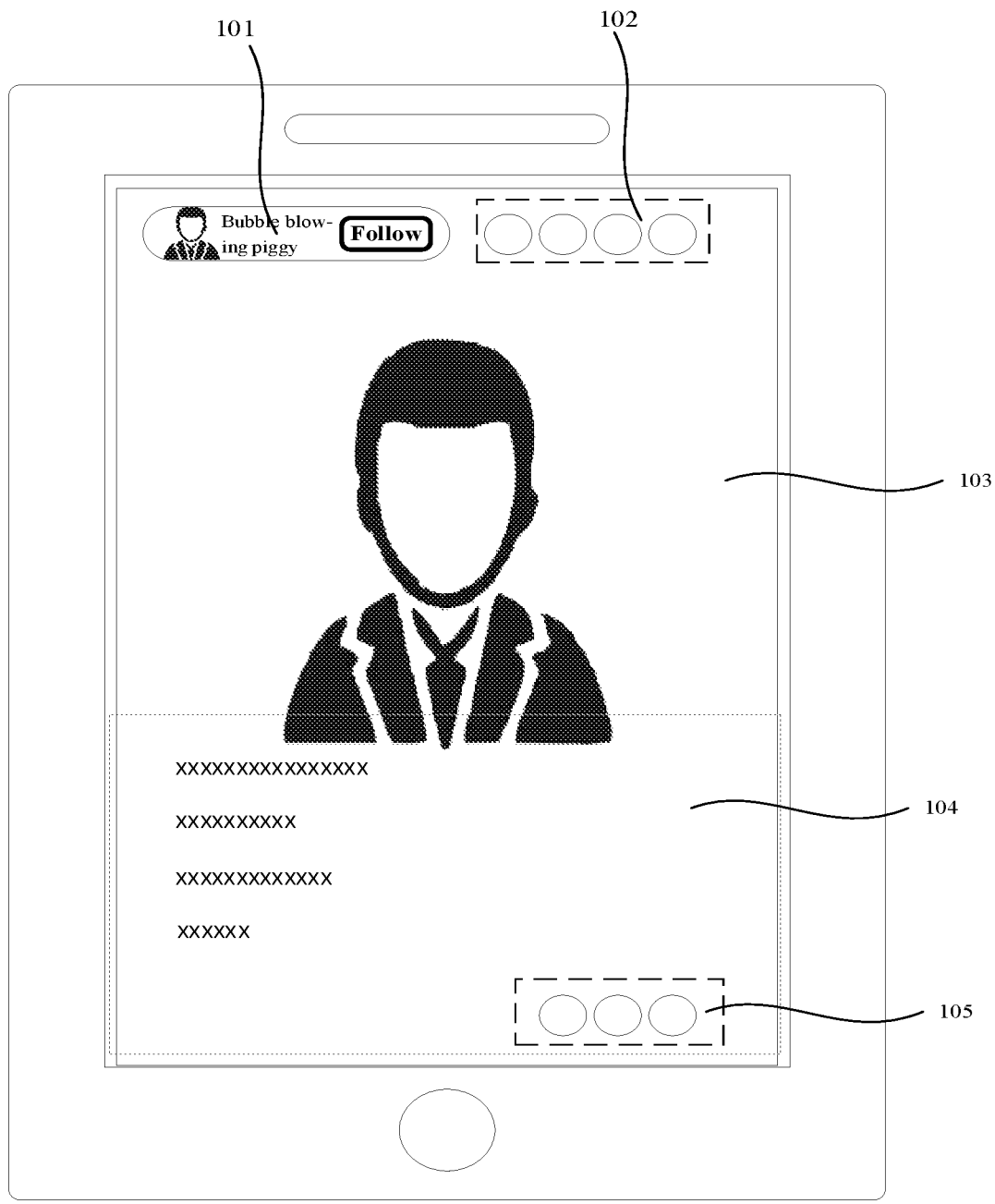
FIG. 2 is a schematic diagram of a live streaming interface displayed at user side according to a conventional technology.

In addition, a related technology for a live streaming interface is introduced below. In the related technology, the live streaming interface displayed at the user terminal is composed of fixed templates, and dimensions of various areas are fixed. FIG. 2 is a schematic diagram of a live streaming interface displayed on a user side according to a related technology. As shown in FIG. 2, an upper area 101 in the live streaming interface is for displaying a name of an anchor and present a prompt of follow the anchor. Another upper area 102 is used for displaying an avatar and a level of an audience viewing the live streaming online. A middle area 103 (generally the entire screen range) is used for displaying a live streaming content of the anchor, including a live streaming scene for the anchor. A lower area 104 is used for displaying comments from the audience users. A background of the lower area 104 is transparent, so that viewing of the live streaming content of the anchor is not affected. A bottom area 105 is used for displaying a gift menu, and the like.

Based on the related technology, the "Follow" button used for prompting the user to follow the anchor is arranged in the upper area of the live streaming interface, and the location and dimension of the button cannot be changed. Since the "Follow" button is located in an upper left corner, rather than in a hot zone or a visual focus area of the audience user, it is not convenient for the audience user to tap the "Follow" button. Moreover, a dimension of a template area for the "Follow" button is small, and therefore a length of an animation and information for guiding the audience user to follow is limited by a dimension of the fixed template, so that the animation and information is less expressive. In addition, due to the limited dimension of the template, some state content cannot be directly presented, but is displayed after multiple taps, which affects an activity of the live streaming room.

Based on this, the method and device for interaction on a live streaming interface, the electronic apparatus, and the computer-readable medium are provided in the embodiments of the present disclosure, so that multiple controls can jointly prompt a user to perform an interactive operation, and thereby the above technical problems of the conventional technology are solved.

The technical solutions of the present disclosure and how the technical solutions of the present disclosure solve the above technical problems are described in detail below with specific embodiments. The following specific embodiments may be combined with each other, and the same or similar concepts or processes may not be repeated in some embodiments.

The method for interaction on a live streaming interface provided in the present disclosure is described in detail below in combination with the following embodiments.

Figure 3:
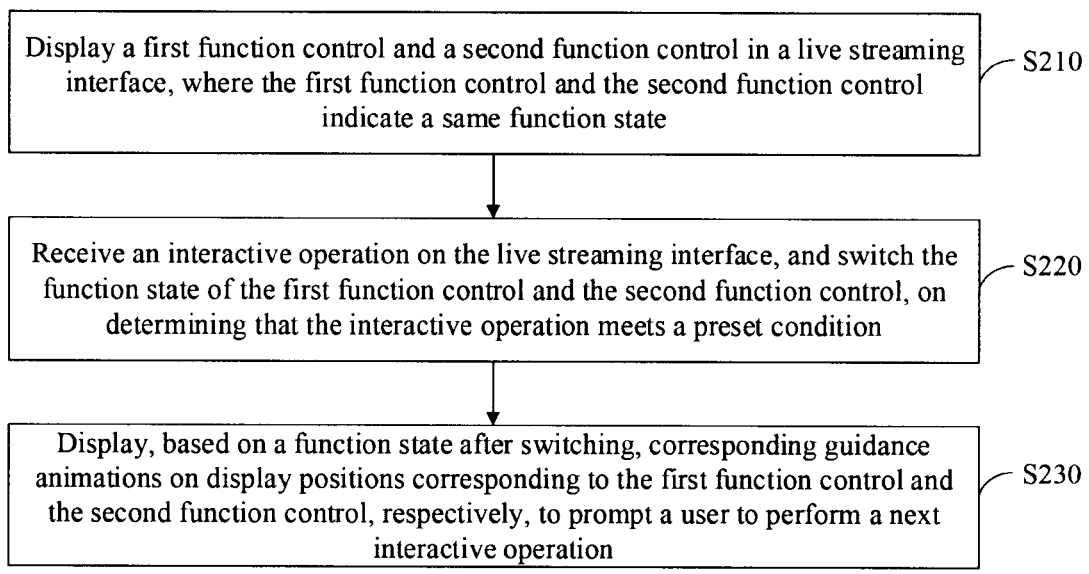
FIG. 3 is a flowchart of a method for interaction on a live streaming interface according to an embodiment of the present disclosure.

FIG. 3 is a flowchart of a method for interaction on a live streaming interface according to an embodiment of the present disclosure. The method is applicable to a live streaming system as shown in FIG. 1 and may be implemented by a user terminal.

Reference is made to FIG. 3. The method for interaction on a live streaming interface may include steps S210 to S230.

In S210, a first function control and a second function control are displayed on the live streaming interface, where the first function control and the second function control indicate a same function state.

In an embodiment of the present disclosure, the first function control and the second function control have a same function in some scenarios, and therefore indicate a same function state. For example, in a scenario where an anchor is to be followed by an audience user, both the first function control and the second function control indicate that the anchor is to be followed by a user and display prompt information about following the anchor. In an embodiment, icons used by the first function control and the second function control to indicate the same function state are different from each other. For example, the first function control displays text "Follow" to prompt the audience user to tap the text "follow" to follow the anchor user, and the second function control displays a symbol "+" to prompt the user to tap the "+" to follow the anchor user. Apparently, in another embodiment, icons of the first function control and the second function control to indicate the same function state are the same. For example, the first function control and the second function control both display text "Follow" or a symbol "+" or other preset text or symbols.

Generally, one function state on the live streaming interface is displayed by one function control. For example, according to the template for a live streaming room, a "Follow" control for prompting an audience user to follow is arranged in an upper left corner of the live streaming interface, as shown in FIG. 2.

According to a conventional template for a live streaming interface, the first function control is fixed in a certain template area, which has fixed location and dimension. In an embodiment of the present disclosure, a second function control is newly added in a designated area on the conventional template for a live streaming interface. The new second function control indicates the same function state as the original first function control. The first function control and the second function control are arranged in different areas of the live streaming interface.

It should be noted that the "first" and "second" in the first function control and the second function control are intended to merely distinguish the two function controls from each other. The above embodiment is only illustrative. That is, in an embodiment of the present disclosure, the first function control may be a newly added function control, and the second function control may be an original function control, which is not limited here.

In an embodiment of the present disclosure, the step S210 of displaying the first function control and the second function control on the live streaming interface may include the following sub-steps S2101 to S2102.

In S2101, a control layout template of the live streaming interface is acquired.

The control layout template of the live streaming interface is pre-set, on which layout positions of various function controls are designated in advance.

In an embodiment of the present disclosure, an appropriate area is designated on the basis of an existing template of a live streaming interface, for arrange the second function control in the area, so as to obtain a new control layout template of the live streaming interface. The user terminal acquires the new control layout template of the live streaming interface, and thereby obtains positions for arranging the first function control and the second function control.

In S2102, the first function control is displayed at an upper position within the live streaming interface, and the second function control is displayed at a lower position within the live streaming interface, according to the control layout template.

In an embodiment of the present disclosure, the newly added second function control is arranged at a lower position, such as a lower right corner, within the live streaming interface. Apparently, in another embodiment, the second function control may be arranged at another position in the live streaming interface, such as a middle right side of the live streaming interface.

The user terminal acquires the control layout template, and obtains layout positions of the first function control and the second function control according to the control layout template. The first function control is displayed on a conventional position, such as a upper position (upper left corner, for example) of the live streaming interface. The second function control is displayed on a newly added position, such as the lower position (lower right corner, for example) of the live streaming interface.

It should be noted that the position for displaying the newly added second function control is preferably set within the hot zone or visual focus area of the audience user. The hot zone or visual focus area of the audience user may be determined based on an analysis of behavioral habits, behavioral preferences, and visual concerns, of the audience user. For example, as the audience user is used to watching a live streaming of the anchor by holding a mobile phone with a right hand, the hot zone of the user tends to be on a lower side of the live streaming interface, such as in the lower right corner area at the bottom; meanwhile a visual focus point of the audience user is usually in the middle area of the live streaming interface. Considering that the second function control blocks a live streaming screen, the second function control may be arranged on the middle right side of the live streaming interface.

In S220, an interactive operation on the live streaming interface is received, and the function state of the first function control and the second function control is switched on determining that the interactive operation meets a preset condition.

The preset condition can trigger an update or switching of the function state of the first function control and the second function control. The interactive operation includes but is not limited to: taping, double taping, long pressing, sliding, and other single-point or multi-point interactive operations.

In an embodiment, the interactive operation may act directly on one of the first function control and the second function control, or simultaneously on both the first function control and the second function control. For example, the interactive operation is single taping the first function control or the second function control, or taping the first function control and the second function control simultaneously. The interactive operation may not directly act on the first function control and the second function control. For example, the interactive operation is double taping on a display screen.

The audience user may perform the interactive operation on the live streaming interface to trigger a switching of the function state of the first function control and the second function control. It should be noted that function states indicated by the first function control and the second function control are consistent to each other before and after switching. That is, in a case that the first function control indicates a first function state before switching, the second function control also indicates the first function state; and in a case that the first function control indicates a second function state after switching, the second function control also indicates the second function state.

In an embodiment of the present disclosure, the step S220 of synchronously switching the function state of the first function control and the second function control on determining that the interaction meets a preset condition includes a sub-step S2201.

In S2201, the function state of the first function control and the second function control is switched from a first function state to a second function state, on determining that the interactive operation acts on one of the first function control and the second function control.

In response to the audience user tapping the first function control or the second function control, a function state switching event is generated, a next function state corresponding to a current function state is obtained, and the next function state is synchronously displayed at positions of the first function control and the second function control, respectively, so as to switch the current function state to the next function state. That is, in response to the function state switching event, the function state of the first function control is switched from the first function state that is currently displayed to the second function state that is to be displayed next, and synchronously the function state of the second function control is switched from the first function state to the second function state.

For example, after the user taps the first function control or the second function control, the function state of the first function control and the second function control switches from a state of to be followed to a state of followed. When the function state changes, icons corresponding to the first function control and the second function control may be changed to indicate change of the function state. For example, the icon of the second function control is changed from the symbol "+" to a symbol "√", in order to indicate that the audience user have successfully followed the anchor.

In S230, guidance animations are displayed at display positions corresponding to the first function control and the second function control, respectively, based on a function state after switching, to prompt a user to perform a next interactive operation.

Contents and time periods of the guidance animations displayed at the display positions corresponding to the first function control and the second function control may be the same or different.

In an embodiment of the present disclosure, due to the limitation of the dimension and location of the template of the live streaming interface, the contents of the guidance animation displayed by the first function control and the second function control at the corresponding display positions may be different, and the time periods for displaying the guidance animations may be different. The fixed first function control is located in the upper left corner on the original live streaming interface template. A space for displaying the first function control is limited, and the time period for the first function control is shorter than that for the second function control. The second function control is a newly added control, and may be fixed at an appropriate position on the new template of the live streaming interface. Alternatively, the second function control may be dynamically suspended on the live streaming interface, and move with a user operation.

In an embodiment, the step S230 of displaying, based on the function state after switching, guidance animations at display positions corresponding to the first function control and the second function control, respectively, to prompt a user to perform a next interactive operation may include a sub-step S2301.

In S2301, a first guidance animation is displayed at a display position corresponding to the first function control, where the first guidance animation disappears after being displayed for a preset time period, and a second guidance animation is displayed at a display position corresponding to the second function control after the first animation disappears.

An icon, such as a heart, is displayed at the display position corresponding to the first function control, to indicate that the audience user has followed the anchor. The first guidance animation is displayed to prompt the audience user to perform a next interactive operation, such as joining a fan club of the anchor. The first guidance animation disappears after the preset time period, and the icon, such as the heart, is remained. The second guidance animation, such as upward floating bubbles, is then displayed at the display position corresponding to the second function control, to guide the user to perform the next interactive operation.

Figure 4:
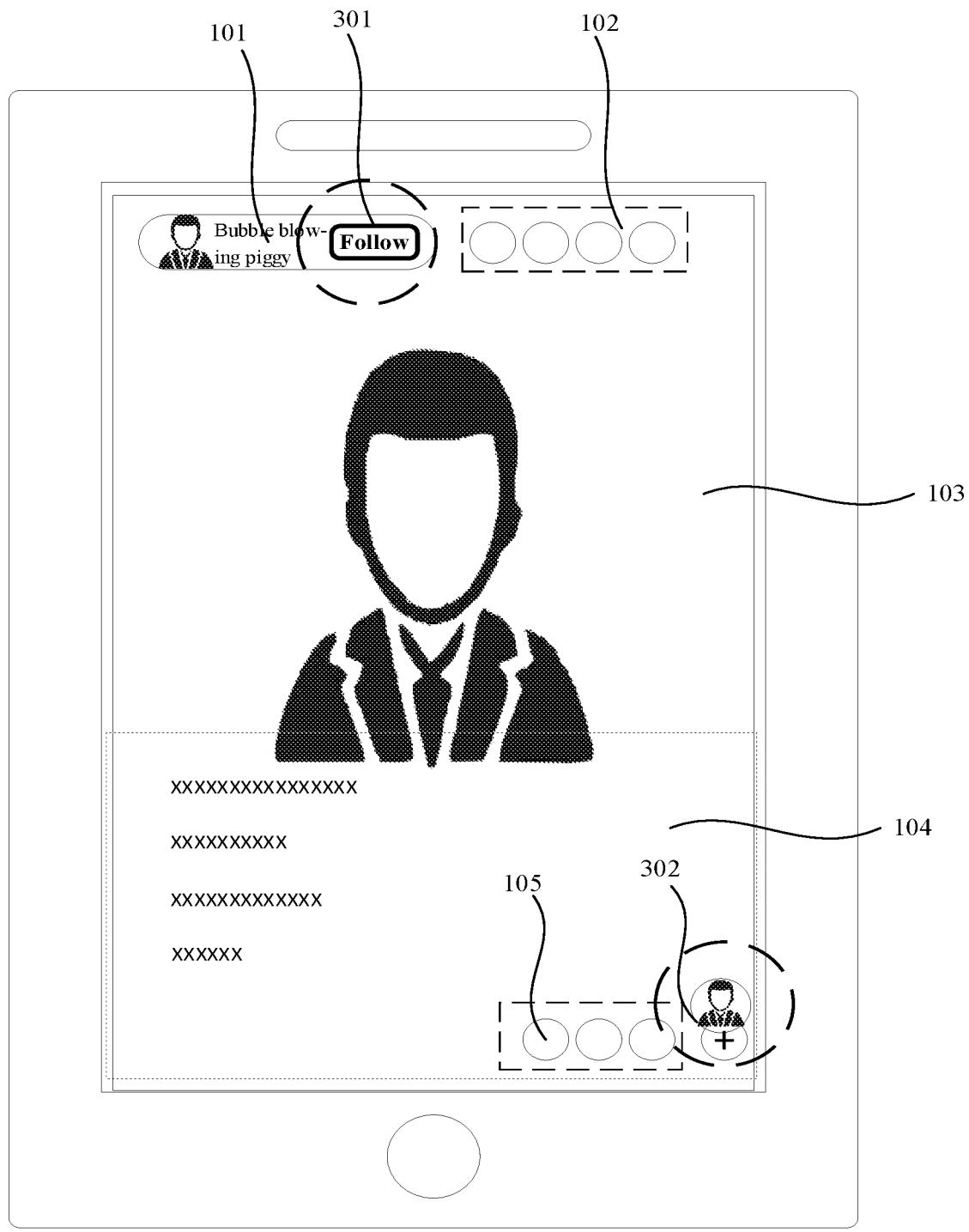
FIG. 4 is a schematic diagram of a live streaming interface according to an embodiment of the present disclosure.

FIG. 4 is a schematic diagram of a live streaming interface according to an embodiment of the present disclosure. As shown in FIG. 4, a first function control 301 is displayed in an upper left corner of the live streaming interface, and text "Follow" is displayed to prompt an audience user to tap the first function control to follow the anchor. A second function control 302 is displayed in a lower right corner of the live streaming interface, and a symbol "+" is displayed to prompt the audience user to tap the second function control to follow the anchor. In response to the audience user tapping the "Follow" or "+", a user terminal receives the tap operation from the user, and synchronously switches the function state at the corresponding position of the first function control and the second function control, on determining that the tap operation on the first function control or the second function control triggers an event of following the anchor.

Figure 5:
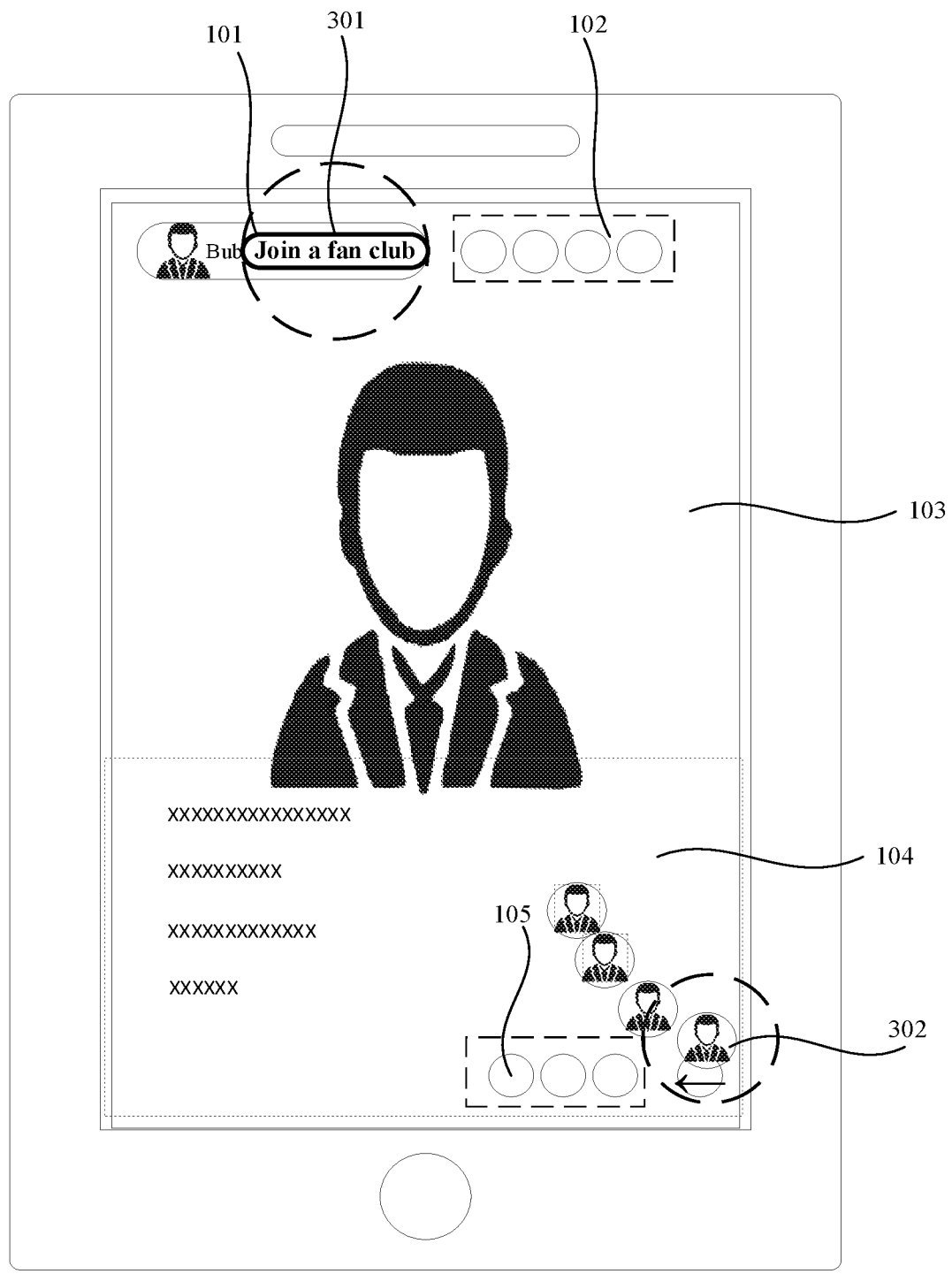
FIG. 5 is a schematic diagram of a live streaming interface according to another embodiment of the present disclosure.

FIG. 5 is a schematic diagram of a live streaming interface according to another embodiment of the present disclosure. As shown in FIG. 5, on reception of a tap operation from a user in order to follow an anchor, a user terminal switches a function state at a position corresponding to a first function control 301 from text "Follow" to text "Join a fan club", so as to prompt the user to tap the first function control to send an interactive operation for joining the fan club through an entrance texted with the "Join the fan group". A symbol of a second function control 302 is changed from "+" to "√", and an animation effect of an icon for joining the fan club, such as upward floating bubbles, is displayed to show a message "Join the fan club to obtain an exclusive medal" to an audience user. The animation effect of a fan club icon may be zoomed, fanned, drifted, or the like, so as to be more expressive. The text "Join a fan club" displayed on the first function control 301 disappears after three seconds, but the entrance to join the fan group on the first function control is not closed. The animation effect of the icon "Join a fan club" on the second function control 302 continues to display, and guides the audience user to join the fan club of the anchor through the entrance for joining the fan club, and guide the audience user to perform a next operation.

The method for interaction on a live streaming interface provided in the embodiments is implemented on a user terminal. The first function control and the second function control indicating a same function state are displayed on the live streaming interface. The interactive operation on the live streaming interface is received, and the function state of the first function control and the second function control is switched synchronously on determining that the interactive operation meets the preset condition. Based on the function state after switching, the guidance animations are displayed at the display positions corresponding to the first function control and the second function control, respectively, to prompt the user to perform the next interactive operation. By two function controls indicating a same function state, expressiveness of the function state is enhanced, which is more conducive to guiding the user to conduct an interactive operation based on the function state.

In the solution of the present disclosure, in addition to the function control set at the fixed position on the template according to the related technology, another function control is added. The two function controls are linked with each other. In response to an interactive operation, such as taping, on one of the function controls to switch a function state, the other one of the function controls switches the function state synchronously even if not taped, so as to keep the consistency of the function state of the two function controls. Therefore, the expressiveness and attractiveness of the function state of the function controls are improved, which is more conducive to guiding the audience user.

In order to make the technical solution clearer and easier to understand, specific implementation process and methods in the technical solution are described in detail below.

In an embodiment, before the step S2201 of synchronously switching the function state of the first function control and the second function control from a first function state to a second function state, the method may further include steps S201 to S202.

In S201, attribute information of an audience user with respect to an anchor user of the live streaming room.

In an embodiment of the present disclosure, the attribute information includes one of the following: an attribute of not followed, an attribute of followed without joining a virtual organization, and an attribute of followed and joined a virtual organization. Apparently, in another embodiment, the attribute information may further include a level of the audience user, a level of the virtual organization where the audience user belongs, rights of the audience user, and other information.

The virtual organization is an organization based on a virtual network world, such as a fan club. In response to the audience user joining the fan club, the audience user becomes a fan of the anchor, has certain rights, and continuously improves the level of the fan club by participating in activities.

In S202, a first function state of the first function control and the second function control are determined based on the attribute information.

In an embodiment of the present disclosure, the first function state of the first function control and the second function control may be determined based on one or more of the attribute information.

In an embodiment, it is determined that the first function state of the first function control and the second function control is a function state of prompting the audience user to follow, in a case that the attribute information indicates the attribute of not followed.

In a case that the audience user has not followed the anchor, it is determined that the attribute information of the audience user indicates the attribute of not followed, and the first function state of the first function control and the second function control is a function state of prompting the audience user to follow the anchor user. For example, the first function control displays text "Follow", and the second function control displays a symbol "+", so as to prompt the audience user to follow the anchor. Correspondingly, after the user taps the first function control or the second function control and follows the anchor, the function state is switched to a next function state of "followed". Based on the function state of "followed", the audience user is guided to perform a next interactive operation, such as joining the fan club of the anchor.

In another embodiment, in a case that the attribute information indicates the attribute of followed without joining the virtual organization, it is determined that the first function state of the first function control and the second function control is a function state of prompting the audience user to join the virtual organization.

In a case that the audience user has followed the anchor but has not joined the fan club of the anchor, it is determined that the attribute information of the audience user indicates the attribute of followed without joining the virtual organization, and the first function state of the first function control and the second function control is a function state of prompting the audience user to join the virtual organization. For example, the first function control displays text "Join the fan group", and the second function control displays a bubble effect for guiding to join the fan group, to guide the audience to follow the anchor. Correspondingly, after the audience user taps the first function control or the second function control and joins the virtual organization, the function state is switched to a next function state of "current level of the virtual organization". Based on the function state of "current level of the virtual organization", the audience user is guided to perform a next interactive operation, such as lighting up a medal, to complete tasks and improve the current level of the virtual organization, such as the current fan club.

In another embodiment, in a case that the attribute information indicates the attribute of followed and joined the virtual organization, it is determined that the first function state of the first function control and the second function control is a function state of presenting a level of the virtual organization that the audience user currently joined.

In a case that the audience user has followed the anchor and joined the fan club, then it is determined that the attribute information of the audience user indicates the attributed of followed and joined the virtual organization, and the first function state of the first function control and the second function control is a function state of presenting a level of the virtual organization currently joined by the audience user. For example, the first function control plays a guiding animation of "light up a medal", and the second function control displays bubbles for guiding to light up the medal, such as text "Light up the medal, the anchor pays more attention to you". Correspondingly, after the spectator user taps the first function control or the second function control to light the medal, the function state is switched to a next function state of "medal lit". Based on the function state of "medal lit", the first function control and the second function control are maintained in the function state of medal lit, and the function state is stopped until a next condition for not lighting the medal is satisfied. For example, in a case that the audience user has not entered the live streaming room of the anchor for more than three days, the medal is no longer lit up and return to the state indicating that the audience user has followed the anchor, joined the virtual organization, but have not lit up the medal.

In an embodiment of the present disclosure, the attribute information of the audience user with respect to the anchor user of the live streaming room is determined on reception of an operation on the live streaming interface by the audience user for the first time. Alternatively, the attribute information of the audience user with respect to the anchor user of the live streaming room may be re-determined in response to the audience user operating on the first function control or the second function control to switch the function state. Alternatively, the attribute information of the audience user with respect to the anchor user of the live streaming room may be acquired on reception of operation information indicating that the audience user re-enters the live streaming room.

Optionally, the attribute information of the audience user with respect to the anchor user of the live streaming room is determined by acquiring an association between the audience user and the anchor user. In a case that the audience user is not associated with the anchor user, it is determined that the attribute information of the audience user with respected to the anchor user of the live streaming room indicates an attribute of not followed. In a case that the audience user followed the anchor, an association is established between the audience user and the anchor user. Further, in a case that the user joins the fan club of the anchor, attribute information indicating an attribute of joining the fan club is added on the basis of establishing the association between the audience user and the anchor user, and the attribute information of the audience user is updated to indicate an attribute of followed and joined the virtual organization. Further, in a case that the user lights up the medal, attribute information of lighting up the medal, and the like, is added on the basis of establishing the association between the audience user and the anchor user and joining the fan club.

It should be noted that the attribute information of the audience user with respect to the anchor user of the live streaming room may be variable. For example, in a case that the user does not enter the live streaming room for a long time to watch the anchor, the lighting of the medal is canceled. In a case that the audience user does not interact for a long time or make bad comments, a level of the audience user is automatically degraded or the audience user is forced to quit the fan club.

In an embodiment of the present disclosure, on reception of the operation information indicating that the audience user re-enters the live streaming room, attribute information of the audience user with respect to the anchor user of the live streaming room is re-acquired, so as to obtain latest attribute information of the audience user with respect to the anchor user of the live streaming room. Based on the latest attribute information, guidance animations are displayed at display positions corresponding to the first function control and the second function control, respectively, to prompt the user to perform a next interactive operation, and the method returns to the step S220 of receiving an interactive operation on the live streaming interface.

It should be noted that the guidance animations may be triggered actively when the audience user triggers the first function control or the second function control to switch the function state, or passively based on the latest attribute information obtained when the audience user re-enters the live streaming room, or globally for a designated audience user through a preset installation on an anchor terminal by the anchor. In an embodiment, a frequency of passive triggers is limited, that is, the number of passive triggers per day cannot exceed a preset number of times, such as 10 times. A frequency of global triggers is not limited, and may be set by the anchor user based on an actual need.

In an embodiment of the present disclosure, the step S2201 of synchronously switching the function state of the first function control and the second function control from a first function state to a second function state may include sub-steps S301 to S302.

In S301, the second function state of the first function control and the second function control after switching from the first function state is determined based on a preset switching sequence of function states.

In an embodiment, there is a sequence for the switching between the first function state and the second function state. For example, the switching sequence of function states is: not followed ⇆ followed without joining the virtual organization ⇆ joined the virtual organization without lighting up the virtual icon ⇆ lit up the virtual icon, and the like.

On reception of a function state switching operation triggered by the audience user, the attribute information of the audience user with respect to the anchor user of the live streaming room is determined, the first function state is determined, and the second function state after switching is determined according to the switching sequence of function states.

In S302, interface components are invoked based on the second function state, and the interface components are displayed at positions corresponding to the first function control and the second function control, respectively.

Different function states correspond to different interface components. For example, an interface component of the first function control corresponding to the function state of not followed has text "Follow", and an interface component of the second function control has a symbol "+". For another example, an interface component of the first function control corresponding to the function state of not joined the fan club has text "Join a fan club", and an interface component of the second function control is a guidance bubble animation texted with "Join the fan club to obtain an exclusive medal of the anchor".

The interface components of the first function control and the second function control are determined based on the second function state, and the interface components are displayed at the positions corresponding to the first function control and the second function control, respectively, so as to present a current function state to the user, and prompt and guide the audience user to perform a next interactive operation.

Figure 6:
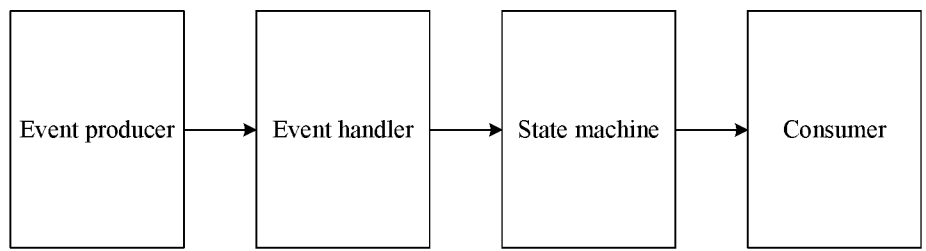
FIG. 6 is a diagram showing a principle of a function state switching according to an embodiment of the present disclosure.

In order to better explain the technical solution, a principle of function state switching is described below in combination with FIG. 6. FIG. 6 is a schematic diagram showing a principle of function state switching according to an embodiment of the present disclosure.

Reference is made to FIG. 6. Taking Android system as an example, an execution process of a function state switching according to an embodiment includes an event producer, an event handler, a state machine and a consumer. The event producer is configured to generate an event of function state switching. An event of function state switching for the first function control or the second function control is generated on reception of a "Follow" interactive operation from the audience user by tapping the first function control or the second function control. The event handler is configured to synchronize the event of function state switching, convert the event to corresponding states of interface components, and set the states to the state machine. For example, the function state switching of the first function control and the function state switching of the second function control are performed simultaneously, so as to switch the function state of the first function control and the second function control from "not followed" to "followed". The state machine is configured to invoke corresponding user interface (UI) components based on the second function state after the function switching of the first function control and the second function control. The consumer is configured to monitor changes of the state machine and display guidance animations at positions corresponding to the first function control and the second function control based on the interface components invoked by the state machine.

On an iOS system, an execution process of function state switching may include: registering a user service (userService); obtaining, through the userService, attribute information of an audience user with respect to an anchor user of the live streaming room, such as whether the audience user has followed the anchor, whether the audience user has joined a fan club of the anchor, and whether the audience user has lit up a medal. In response to the audience user triggering a first function control or a second function control, such as taping to follow the anchor, the userService is invoked to change a function state of the userService, for example, from "not followed" to "followed". After the function state is switched, the userService sends a notification to the first function control and the second function control, so that corresponding guiding animations are displayed at display positions corresponding to the first function control and the second function control, respectively. For example, the first function control displays a text effect of "Join a fan club", and the second function control displays a guidance bubble animation of "Join the fan club to obtain an exclusive medal of the anchor", and the like.

The above examples are provided to merely assist in elaborating the technical solution of the disclosure, and the graphic contents and specific processes involved therein do not constitute a limitation on application scenarios of the technical solution of the present disclosure.

The relevant embodiments of the live streaming interface interaction device are described in detail below.

Figure 7:
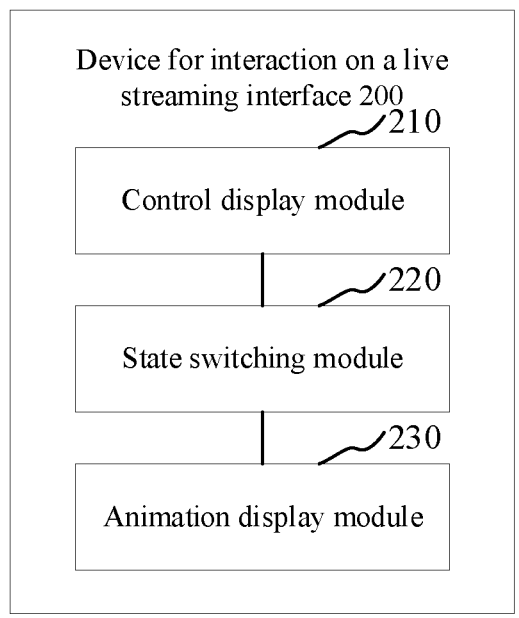
FIG. 7 is a schematic structural diagram of a device for interaction on a live streaming interface according to an embodiment of the present disclosure.

FIG. 7 is a structural diagram of a device for interaction on a live streaming interface according to an embodiment of the present disclosure. As shown in FIG. 7, the device 200 for interaction on a live streaming interface may include a control display module 210, a state switching module 220, and an animation display module 230.

The control display module 210 is configured to display a first function control and a second function control on a live streaming interface, where the first function control and the second function control indicate a same function state.

The state switching module 220 is configured to receive an interactive operation on the live streaming interface, and switch the function state of the first function control and the second function control synchronously, on determining that the interactive operation meets a preset condition.

The animation display module 230 is configured to display, based on a function state after switching, guidance animations at display positions corresponding to the first function control and the second function control, respectively, to prompt the user to perform a next interactive operation.

In the device provided in the embodiment, the control display module 210 displays the first function control and the second function control indicating a same function state on the live streaming interface; the state switching module 220 receives the interactive operation on the live streaming interface, and synchronously switches the function state of the first function control and the second function control on determining that the interactive operation meets the preset conditions; and the animation display module 230 displays, based on the function state after switching, the guidance animations at positions corresponding to the first function control and the second function control, respectively, to prompt the user to perform the next interactive operation. Hence, two function controls present a same function state, which can enhance the expressiveness of the function state, and is more conducive to guiding the user to perform an interactive operation based on the function state.

In an embodiment of the present disclosure, the state switching module 220 is specifically configured to synchronously switch the function state of the first function control and the second function control from a first function state to a second function state, on determining that the interactive operation acts on one of the first function control and the second function control.

In an embodiment of the present disclosure, the device 200 further includes an attribute information determination module and a function state determination module. The attribute information determination module is configured to determine attribute information of an audience user with respect to an anchor user of a live streaming room. The function state determination module is configured to determine, based on the attribute information, the first function state of the first function control and the second function control.

In an embodiment of the present disclosure, the attribute information includes indicate one of the following: an attribute of not followed, an attribute of followed without joining a virtual organization, and an attribute of followed and joined the virtual organization.

In an embodiment of the present disclosure, the function state determination module includes a first state determination unit, a second state determination unit, and a third state determination unit. The first state determination unit is configured to determine that the first function state of the first function control and the second function control is a function state of prompting the audience user to follow the anchor user, in a case that that the attribute information indicates the attribute of not followed. The second state determination unit is configured to determine that the first function state of the first function control and the second function control is a function state of prompting the audience user to join the virtual organization, in a case that the attribute information indicates the attribute of followed without joining the virtual organization. The third state determination unit is configured to determine that the first function state of the first function control and the second function control is a function state of presenting a level of the virtual organization that the audience user currently joined, in a case that the attribute information indicates the attribute of followed and joined the virtual organization.

In an embodiment of the present disclosure, the state switching module 220 includes an after-switching state determination unit and an interface component display unit. The after-switching state determination unit is configured to determine, based on a preset switching sequence of function states, the second function state of the first function control and the second function control after switching from the first function state. The interface component display unit is configured to invoke interface components based on the second function state, and display the interface components at positions corresponding to the first function control and the second function control, respectively.

In an embodiment of the present disclosure, the device 200 further includes: a latest information acquisition module and a guidance animation display module. The latest information acquisition module is configured to acquire latest attribute information of an audience with respect to an anchor user of the live streaming room, on reception of operation information indicating that the audience user re-enters the live streaming room. The guidance animation display module is configured to display, based on the latest attribute information, guidance animations at display positions corresponding to the first function control and the second function control, to prompt the user to perform a next interactive operation, and return to the step of receiving an interactive operation on the live streaming interface.

In an embodiment of the present disclosure, the control display module 210 includes a layout template acquisition unit and a function control display unit. The layout template acquisition unit is configured to acquire a control layout template of the live streaming interface. The function control display unit is configured to display the first function control at an upper position within the live streaming interface, and display the second function control at a lower position within the live streaming interface, according to the control layout template.

In an embodiment of the present disclosure, the animation display module 230 is specifically configured to display a first guidance animation at a display position corresponding to the first function control, where the first guidance animation disappears after being displayed for a preset time period; and display a second guidance animation at a display position corresponding to the second function control, after the first animation disappears.

The device for interaction on a live streaming interface provided above can implement the method for interaction on a live streaming interface provided in any of the above embodiments, and has corresponding functions and beneficial effects.

Figure 8:
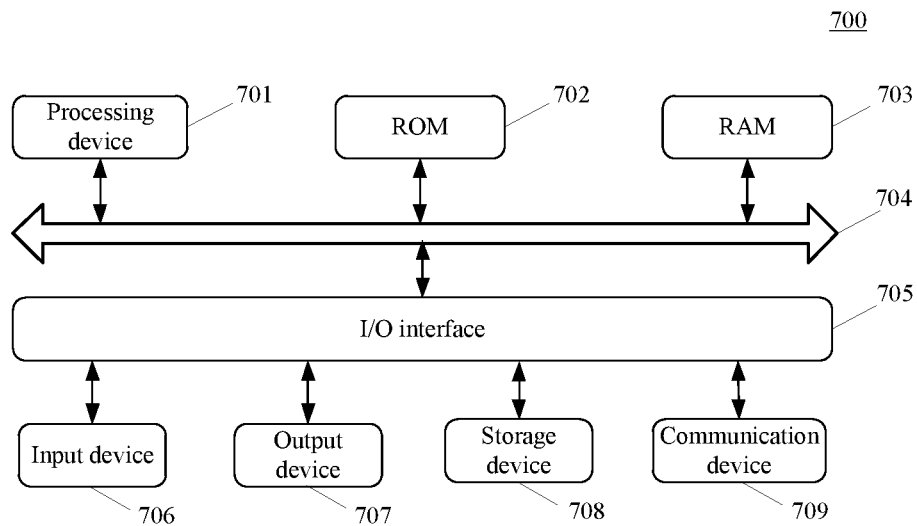
FIG. 8 is a schematic structural diagram of an electronic apparatus for interaction on a live streaming interface according to an embodiment of the present disclosure.

Reference is made to FIG. 8, which is a structural diagram of an electronic apparatus for interacting with a live interface according to an embodiment of the present disclosure, which shows a structural diagram of an electronic apparatus 700 (such as the user terminal in FIG. 1) suitable for implementing the embodiments of the present disclosure. The electronic apparatus in the embodiment of the present disclosure may be included as a client device. The electronic apparatus shown in FIG. 8 is only an example, and should not bring any restriction on functions and usage scope of the embodiments of the present disclosure.

The electronic apparatus includes a memory and a processor. The processor hereinafter may be referred to as a processing device 701. The memory may include at least one of the following read-only memory (ROM) 702, random access memory (RAM) 703, and storage device 708, which are described in detail below.

As shown in FIG. 8, the electronic apparatus 700 may include a processing device (such as a central processing unit, and a graphics processor) 701 that may execute various appropriate actions and processes according to a program stored in a read only memory (ROM) 702 or loaded into random access memory (RAM) 703 from a storage device 708. Various programs and data necessary for the operation of the electronic apparatus 700 are also stored in the RAM 703. The processing device 701, the ROM 702, and the RAM 703 are connected to each other through a bus 704. An input/output (I/O) interface 705 is also connected to the bus 704.

Generally, the following devices may be connected to the I/O interface 705: an input device 706 such as a touch screen, a touchpad, a keyboard, a mouse, a camera, a microphone, an accelerometer, a gyroscope, and the like; an output device 707, such as a liquid crystal display (LCD), a speaker, a vibrator, and the like; a storage device 708, such as a magnetic tape, a hard disk, and the like; and a communication device 709. The communication device 709 may enable the electronic apparatus 700 to communicate in a wireless or wired manner with other devices to exchange data. Although FIG. 8 shows the electronic apparatus 700 having various devices, it should be understood that not all of the illustrated devices are required to be implemented or provided. More or fewer devices may alternatively be implemented or provided.

In particular, according to embodiments of the present disclosure, the processes described above with reference to the flowcharts may be implemented as computer software programs. For example, embodiments of the present disclosure include a computer program product including a computer program carried on a non-transitory computer readable medium. The computer program includes program code for performing the method illustrated in the flowchart. In such an embodiment, the computer program may be downloaded and installed from the network via the communication device 709, or from the storage device 708, or from the ROM 702. When the computer program is executed by the processing device 701, the above-mentioned functions in the methods of the embodiments of the present disclosure are executed.

It should be noted that the computer-readable medium mentioned above in the present disclosure may be a computer-readable signal medium or a computer-readable storage medium, or any combination thereof. The computer-readable storage medium may be, for example, but not limited to, an electrical, magnetic, optical, electromagnetic, infrared, or semiconductor system, device or components, or any combination thereof. More specific examples of computer readable storage media may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In this disclosure, a computer-readable storage medium may be any tangible medium that contains or stores a program that can be used by or in conjunction with an instruction execution system, apparatus or device. In the present disclosure, a computer-readable signal medium may include a data signal propagated in baseband or as part of a carrier wave with computer-readable program code embodied thereon. Such propagated data signals may be in a variety of forms, including but not limited to electromagnetic signals, optical signals, or any suitable combination thereof. A computer-readable signal medium may be any computer-readable medium other than a computer-readable storage medium that can transmit, propagate, or transport the program for use by or in connection with the instruction execution system, apparatus or device. Program code stored on a computer-readable medium may be transmitted using any suitable medium, including, but not limited to, an electrical wire, an optical fiber cable, RF (radio frequency), or any suitable combination thereof.

In some embodiments, the client and the server may perform communication by using any known network protocol such as Hyper Text Transfer Protocol (HTTP) or any network protocol to be developed, and may connect with digital data in any form or carried in any medium (for example, a communication network). The communication network includes a local area network (LAN), a wide area network (WAN), an international network (for example the internet), a peer-to-peer network (for example ad hoc peer-to-peer network), and any known network or network to be developed.

The above-mentioned computer-readable medium may be included in the electronic apparatus, or may be standalone without being assembled into the electronic apparatus.

The above-mentioned computer-readable medium carries one or more programs. The one or more programs, when executed by the electronic apparatus, configure the electronic apparatus to: display a first function control and a second function control on a live streaming interface, where the first function control and the second function control indicate a same function state; receive an interactive operation on the live streaming interface, and switch the function state of the first function control and the second function control on determining that the interactive operation meets a preset condition; and display, based on a function state after switching, guidance animations at display positions corresponding to the first function control and the second function control, respectively, to prompt a user to perform a next interactive operation.

Computer program code for performing operations of the present disclosure may be written in one or more programming languages, including but not limited to object-oriented programming languages, such as Java, Smalltalk, and C++, and conventional procedural programming languages, such as the "C" language or similar programming languages. The program code may be executed entirely on a user computer, or partly on a user computer, or as a stand-alone software package, or partly on a user computer and partly on a remote computer, or entirely on a remote computer or server. In the case of using a remote computer, the remote computer may be connected to a user computer through any kind of network, including a local area network (LAN) or a wide area network (WAN), or may be connected to an external computer (e.g., using Internet connection provided by an Internet service provider).

The flowchart and block diagrams in the Figures illustrate the architecture, functionality, and operations of possible implementations of systems, methods and computer program products according to various embodiments of the present disclosure. In this regard, each block in the flowcharts or block diagrams may represent a module, program segment, or a portion of code that contains one or more executable instructions for implementing the specified logical functions. It should also be noted that, in some alternative implementations, the functions noted in the blocks may occur in an order other than the order shown in the figures. For example, two blocks shown in succession may be executed substantially concurrently, or the blocks may sometimes be executed in a reverse order, depending upon the functionality involved. It is also noted that each block of the block diagrams and/or flowchart illustrations, and combinations of blocks in the block diagrams and/or flowchart illustrations, may be implemented in dedicated hardware-based systems that perform specified functions or operations, or may be implemented by a combination of dedicated hardware and computer instructions.

The units involved in the embodiments of the present disclosure may be implemented in a software manner, or in a hardware manner. The name of the unit or module does not constitute a limitation of the unit under any circumstances. For example, the receiving module may be described as a module for receiving a first serial number.

The functions described above may be performed, at least in part, by one or more hardware logic components. For example, without limitation, examples of hardware logic components that may be used include: a Field Programmable Gate Array (FPGA), an Application Specific Integrated Circuit (ASIC), an Application Specific Standard Product (ASSP), a System on Chip (SOC), a Complex Programmable Logical Device (CPLD) and the like.

In the present disclosure, a machine-readable medium may be a tangible medium that may contain or store a program for use by or in connection with an instruction execution system, device or apparatus. The machine-readable medium may be a machine-readable signal medium or a machine-readable storage medium. Machine-readable media may include, but are not limited to, electronic, magnetic, optical, electromagnetic, infrared, or semiconductor systems, devices, or apparatuses, or any suitable combination thereof. More specific examples of machine-readable storage media include electrical connections based on one or more wires, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination thereof.

According one or more embodiments of the present disclosure, a method for interaction on a live streaming interface is provided. The method includes: displaying a first function control and a second function control on a live streaming interface, wherein the first function control and the second function control indicate a same function state; receiving an interactive operation on the live streaming interface, and switching the function state of the first function control and the second function control on determining that the interactive operation meets a preset condition; and displaying, based on a function state after switching, guidance animations at display positions corresponding to the first function control and the second function control, respectively, to prompt a user to perform a next interactive operation.

In an embodiment, the switching the function state of the first function control and the second function control on determining that the interactive operation meets a preset condition includes: synchronously switching the function state of the first function control and the second function control from a first function state to a second function state, on determining that the interactive operation acts on one of the first function control and the second function control.

In an embodiment, before the synchronously switching the function state of the first function control and the second function control from a first function state to a second function state, the method further includes: determining attribute information of an audience user with respect to an anchor user of the live streaming room; and determining, based on the attribute information, the first function state of the first function control and the second function control.

In an embodiment, the attribute information indicates one of the following: an attribute of not followed, an attribute of followed without joining a virtual organization, and an attribute of followed and joined a virtual organization.

In an embodiment, the determining, based on the attribute information, the first function state of the first function control and the second function control includes: determining that the first function state of the first function control and the second function control is a function state of prompting the audience user to follow the anchor user, in a case that the attribute information indicates the attribute of not followed; determining that the first function state of the first function control and the second function control is a function state of prompting the audience user to join the virtual organization, in a case that the attribute information indicates the attribute of followed without joining the virtual organization; and determining that the first function state of the first function control and the second function control is a function state of presenting a level of the virtual organization that the audience user currently joined, in a case that the attribute information indicates the attribute of followed and joined the virtual organization.

In an embodiment, the synchronously switching the function state of the first function control and the second function control from a first function state to a second function state includes: determining, based on a preset switching sequence of function states, the second function state of the first function control and the second function control after switching from the first function state; and invoking interface components based on the second function state, and displaying the interface components at display positions corresponding to the first function control and the second function control, respectively.

In an embodiment, the method further includes: acquiring latest attribute information of an audience with respect to an anchor user of the live streaming room, on reception of operation information indicating that the audience user re-enters the live streaming room; and displaying, based on the latest attribute information, guidance animations at display positions corresponding to the first function control and the second function control, to prompt the user to perform a next interactive operation, and returning to the step of receiving an interactive operation on the live streaming interface.

In an embodiment, the displaying a first function control and a second function control on a live streaming interface includes: acquiring a control layout template of the live streaming interface; displaying the first function control at an upper position within the live streaming interface, and displaying the second function control on a lower position within the live streaming interface, according to the control layout template.

In an embodiment, the displaying guidance animations at display positions corresponding to the first function control and the second function control, respectively, includes: displaying a first guidance animation at a display position corresponding to the first function control, where the first guidance animation disappears after being displayed for a preset time period; and displaying a second guidance animation at a display position corresponding to the second function control, after the first animation disappears.

According to one or more embodiment of the present disclosure, a device for interaction on a live streaming interface is provided. The device includes: a control display module, configured to display a first function control and a second function control on a live streaming interface, wherein the first function control and the second function control indicate a same function state; a state switching module, configured to receive an interactive operation on the live streaming interface, and synchronously switch the function state of the first function control and the second function control, on determining that the interactive operation meets a preset condition; and an animation display module, configured to display, based on a function state after switching, guidance animations at display positions corresponding to the first function control and the second function control, respectively, to prompt a user to perform a next interactive operation.

In an embodiment, the state switching module is specifically configured to synchronously switch the function state of the first function control and the second function control from a first function state to a second function state, on determining that the interactive operation acts on one of the first function control and the second function control.

In an embodiment, the device further includes an attribute information determination module and a function state determination module. The attribute information determination module is configured to determine attribute information of an audience user with respect to an anchor user of a live streaming room. The function state determination module is configured to determine, based on the attribute information, the first function state of the first function control and the second function control.

In an embodiment, the attribute information includes indicate one of the following: an attribute of not followed, an attribute of followed without joining a virtual organization, and an attribute of followed and joined the virtual organization.

In an embodiment, the function state determination module includes a first state determination unit, a second state determination unit, and a third state determination unit. The first state determination unit is configured to determine that the first function state of the first function control and the second function control is a function state of prompting the audience user to follow the anchor user, in a case that that the attribute information indicates the attribute of not followed. The second state determination unit is configured to determine that the first function state of the first function control and the second function control is a function state of prompting the audience user to join the virtual organization, in a case that the attribute information indicates the attribute of followed without joining the virtual organization. The third state determination unit is configured to determine that the first function state of the first function control and the second function control is a function state of presenting a level of the virtual organization that the audience user currently joined, in a case that the attribute information indicates the attribute of followed and joined the virtual organization.

In an embodiment, the state switching module includes an after-switching state determination unit and an interface component display unit. The after-switching state determination unit is configured to determine, based on a preset switching sequence of function states, the second function state of the first function control and the second function control after switching from the first function state. The interface component display unit is configured to invoke interface components based on the second function state, and display the interface components at positions corresponding to the first function control and the second function control, respectively.

In an embodiment, the device further includes: a latest information acquisition module and a guidance animation display module. The latest information acquisition module is configured to acquire latest attribute information of an audience with respect to an anchor user of the live streaming room, on reception of operation information indicating that the audience user re-enters the live streaming room. The guidance animation display module is configured to display, based on the latest attribute information, guidance animations at display positions corresponding to the first function control and the second function control, to prompt the user to perform a next interactive operation, and return to the step of receiving an interactive operation on the live streaming interface.

In an embodiment, the control display module includes a layout template acquisition unit and a function control display unit. The layout template acquisition unit is configured to acquire a control layout template of the live streaming interface. The function control display unit is configured to display the first function control at an upper position within the live streaming interface, and display the second function control at a lower position within the live streaming interface, according to the control layout template.

In an embodiment, the animation display module is specifically configured to display a first guidance animation at a display position corresponding to the first function control, where the first guidance animation disappears after being displayed for a preset time period; and display a second guidance animation at a display position corresponding to the second function control, after the first animation disappears.

According to one or more embodiments of the present disclosure, an electronic apparatus is provided, including: one or more processors; a memory; and one or more application programs. The one or more application programs are stored in the memory and configured to be executed by the one or more processors. The one or more application programs are configured to perform the method for interaction on a live streaming interface.

According to one or more embodiments of the present disclosure, a computer-readable medium storing a computer program is provided. The computer program, when executed by a processor, implements the method for interaction on a live streaming interface.

The above merely describes preferred embodiments of the present disclosure and illustrates the technical principles. Those skilled in the art should understand that the scope of the disclosure is not limited to the technical solutions formed by the specific combination of the above-mentioned technical features, and should also cover the technical solutions formed by any combination of the above-mentioned technical features or other equivalent features, without departing from the above disclosed concept. For example, a technical solution may be formed by replacing a feature with another feature having similar function disclosed in (but not limited to) the present disclosure.

Additionally, although operations are described in a particular order, this should not be construed as requiring that the operations to be performed in the particular order shown or in a sequential order. Under certain circumstances, multitasking and parallel processing may be advantageous. Similarly, although the above description contains several implementation details, these should not be construed as limitations on the scope of the present disclosure. Some features that are described in different embodiments may also be implemented in a same embodiment. Various features that are described in a single embodiment may be implemented in multiple embodiments separately or in any suitable sub-combination.

Although the subject matter has been described in language specific to structural features and/or logical acts, it is to be understood that the subject matter defined in the appended claims is not necessarily limited to the specific features or acts described above. Rather, the specific features and acts described above are merely examples for implementing the claims.

The invention claimed is:

1. A method for interaction on a live streaming interface, comprising:
   displaying a first function control and a second function control on a live streaming interface, wherein the first function control and the second function control indicate a same function state;
   receiving an interactive operation on the live streaming interface, and switching the function state of the first function control and the second function control on determining that the interactive operation meets a preset condition; and
   displaying, based on a function state after switching, guidance animations at display positions corresponding to the first function control and the second function control, respectively, to prompt a user to perform a next interactive operation.

2. The method according to claim 1, wherein the switching the function state of the first function control and the second function control on determining that the interactive operation meets a preset condition comprises:

synchronously switching the function state of the first function control and the second function control from a first function state to a second function state, on determining that the interactive operation acts on one of the first function control and the second function control.

3. The method according to claim 2, wherein before the synchronously switching the function state of the first function control and the second function control from a first function state to a second function state, the method further comprises:
   determining attribute information of an audience user with respect to an anchor user of the live streaming room; and
   determining, based on the attribute information, the first function state of the first function control and the second function control.

4. The method according to claim 1, wherein the attribute information indicates one of the following: an attribute of not followed, an attribute of followed without joining a virtual organization, and an attribute of followed and joined a virtual organization.

5. The method according to claim 4, where the determining, based on the attribute information, the first function state of the first function control and the second function control comprises:
   determining that the first function state of the first function control and the second function control is a function state of prompting the audience user to follow the anchor user, in a case that the attribute information indicates the attribute of not followed;
   determining that the first function state of the first function control and the second function control is a function state of prompting the audience user to join the virtual organization, in a case that the attribute information indicates the attribute of followed without joining the virtual organization; and
   determining that the first function state of the first function control and the second function control is a function state of presenting a level of the virtual organization that the audience user currently joined, in a case that the attribute information indicates the attribute of followed and joined the virtual organization.

6. The method according to claim 5, wherein the synchronously switching the function state of the first function control and the second function control from a first function state to a second function state comprises:
   determining, based on a preset switching sequence of function states, the second function state of the first function control and the second function control after switching from the first function state; and
   invoking interface components based on the second function state, and displaying the interface components at positions corresponding to the first function control and the second function control, respectively.

7. The method according to claim 1, further comprising:
   acquiring latest attribute information of an audience with respect to an anchor user of the live streaming room, on reception of operation information indicating that the audience user re-enters the live streaming room; and
   displaying, based on the latest attribute information, guidance animations at display positions corresponding to the first function control and the second function control, to prompt the user to perform a next interactive operation, and returning to the step of receiving an interactive operation on the live streaming interface.

8. The method according to claim 1, wherein the displaying a first function control and a second function control on a live streaming interface comprises:
   acquiring a control layout template of the live streaming interface; and
   displaying the first function control at an upper position within the live streaming interface, and displaying the second function control at a lower position within the live streaming interface, according to the control layout template.

9. The method according to claim 8, wherein the displaying guidance animations at display positions corresponding to the first function control and the second function control, respectively, comprises:
   displaying a first guidance animation at a display position corresponding to the first function control, wherein the first guidance animation disappears after being displayed for a preset time period; and
   displaying a second guidance animation at a display position corresponding to the second function control, after the first guidance animation disappears.

10. A apparatus for interaction on a live streaming interface, comprising:
    at least one processor; and
    at least one memory communicatively coupled to the at least one processor and storing instructions that upon execution by the at least one processor cause the apparatus to:
    display a first function control and a second function control on a live streaming interface, wherein the first function control and the second function control indicate a same function state;
    receive an interactive operation on the live streaming interface, and synchronously switch the function state of the first function control and the second function control, on determining that the interactive operation meets a preset condition; and
    display, based on a function state after switching, guidance animations at display positions corresponding to the first function control and the second function control, respectively, to prompt a user to perform a next interactive operation.

11. A computer-readable non-transitory medium storing non-transitory computer readable instructions, wherein
    the non-transitory computer readable instructions, when executed by a computer, cause the computer to
    display a first function control and a second function control on a live streaming interface, wherein the first function control and the second function control indicate a same function state;
    receive an interactive operation on the live streaming interface, and synchronously switch the function state of the first function control and the second function control, on determining that the interactive operation meets a preset condition; and
    display, based on a function state after switching, guidance animations at display positions corresponding to the first function control and the second function control, respectively, to prompt a user to perform a next interactive operation.

12. The apparatus of claim 10, the at least one memory further storing instructions that upon execution by the at least one processor cause the apparatus to:
    synchronously switch the function state of the first function control and the second function control from a first function state to a second function state, on determining that the interactive operation acts on one of the first function control and the second function control.

13. The apparatus of claim 12, the at least one memory further storing instructions that upon execution by the at least one processor cause the apparatus to:
   determine attribute information of an audience user with respect to an anchor user of the live streaming room; and
   determine, based on the attribute information, the first function state of the first function control and the second function control.

14. The apparatus of claim 13, wherein the attribute information indicates one of the following: an attribute of not followed, an attribute of followed without joining a virtual organization, and an attribute of followed and joined a virtual organization.

15. The apparatus of claim 14, the at least one memory further storing instructions that upon execution by the at least one processor cause the apparatus to:
   determine that the first function state of the first function control and the second function control is a function state of prompting the audience user to follow the anchor user, in a case that the attribute information indicates the attribute of not followed;
   determine that the first function state of the first function control and the second function control is a function state of prompting the audience user to join the virtual organization, in a case that the attribute information indicates the attribute of followed without joining the virtual organization; and
   determine that the first function state of the first function control and the second function control is a function state of presenting a level of the virtual organization that the audience user currently joined, in a case that the attribute information indicates the attribute of followed and joined the virtual organization.

16. The apparatus of claim 15, the at least one memory further storing instructions that upon execution by the at least one processor cause the apparatus to:
   determine, based on a preset switching sequence of function states, the second function state of the first function control and the second function control after switching from the first function state; and
   invoke interface components based on the second function state, and displaying the interface components at positions corresponding to the first function control and the second function control, respectively.

17. The apparatus of claim 10, the at least one memory further storing instructions that upon execution by the at least one processor cause the apparatus to:
   acquire latest attribute information of an audience with respect to an anchor user of the live streaming room, on reception of operation information indicating that the audience user re-enters the live streaming room; and
   display, based on the latest attribute information, guidance animations at display positions corresponding to the first function control and the second function control, to prompt the user to perform a next interactive operation, and returning to the step of receiving an interactive operation on the live streaming interface.

18. The apparatus of claim 10, the at least one memory further storing instructions that upon execution by the at least one processor cause the apparatus to:
   acquire a control layout template of the live streaming interface; and
   display the first function control at an upper position within the live streaming interface, and displaying the second function control at a lower position within the live streaming interface, according to the control layout template.

19. The apparatus of claim 18, the at least one memory further storing instructions that upon execution by the at least one processor cause the apparatus to:
   display a first guidance animation at a display position corresponding to the first function control, wherein the first guidance animation disappears after being displayed for a preset time period; and
   display a second guidance animation at a display position corresponding to the second function control, after the first guidance animation disappears.

* * * * *